UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

VARNISH, ENAMEL, OR LACQUER COMPOSITION.

1,137,374.     Specification of Letters Patent.     Patented Apr. 27, 1915.

No Drawing. Original application filed February 11, 1910, Serial No. 543,239. Divided and this application filed December 2, 1913. Serial No. 804,220.

*To all whom it may concern:*

Be it known that I, JONAS W. AYLSWORTH, a citizen of the United States, residing in East Orange, county of Essex, State of New Jersey, have invented certain new and useful Improvements in Varnish, Enamel, or Lacquer Compositions, of which the following is a description.

My invention relates to a new composition of matter which is adapted especially for use as an enamel, lacquer or varnish, and my object is the production of such a composition.

This application is a division of my Patent No. 1,098,608, dated June 2, 1914, entitled "enamel lacquer or varnish." The patent referred to claims as a composition of matter or as a varnish ingredient, a mixture of certain normally-non-liquid substances which are soluble in common solvents, and which are capable of combining together on application of heat to form a hard, infusible insoluble product.

The present application describes and claims a varnish or enamel composition and process of making it, the same comprising a solution of the mixture of non-liquid ingredients referred to above, in a suitable solvent, which composition hardens on subsequent heat treatment.

My invention contemplates such a varnish or enamel as may be formed on metals and wood, or is adapted to form a hard surface on cardboard, fabric, paper, leather, etc., to form a surface adapted for embossing operations, making negatives, matrices for engraving and printing, forming a hard surface suitable for molding sound records, and incorporating with various inert pulverized materials and pigments to form veneers for wood. It also is adapted to be incorporated with woven fabrics or paper to form bindings for books, and in the manufacture of a variety of articles.

My invention comprises broadly a fusible resin of phenolic origin, which has mixed therewith a substance which is adapted to react with the resin upon the application of sufficient heat to form a hard insoluble condensation product.

More specifically, my invention comprises a varnish resin which is soluble in the usual solvents, of shellac, and which may range from pale amber to various shades of transparent brown in color, and which hardens on the application of heat at a temperature of from 170 to 220 degrees F., or higher. The varnish upon heating, as described, forms a refractory enamel more refractory than ebonite or hard rubber, and almost equaling ivory in hardness and strength. It is at the same time more capable than are the substances mentioned of withstanding the action of chemical agents and heat.

My improved varnish composition is formed by the incorporation of substances containing the methylene radical $CH_2$ preferably hexa-methylene-amin or hexa-methylene-tetra-amin, as it is sometimes called $(CH_2)_6N_4$ with a phenol resin, such as described in my patent 1,102,630 dated July 7, 1914, plastic composition and process of manufacturing the same, and Patent No. 1,029,737, granted June 18, 1912. Or, in place of hexa-methylene-tetra-amin, I may use the product obtained by reacting upon aqueous solutions of ammonia with formaldehyde or polymers thereof, which product may contain other methylene-amins, as explained in my Patent No. 1,020,593, granted March 19, 1912. Various of the so-called shellac substitutes of phenolic or cresolic origin may, however, be substituted for the phenol resin referred to above, with good results, in many of the uses of the enamel.

The resin or shellac substitute and the methylene-amin are dissolved in a suitable solvent such as alcohol, acetone or equivalent solvent. The methylene-amin compound performs the function of reacting with the fusible phenol condensation product or phenol resin upon the application of sufficient heat to harden the same by transforming it into an infusible final condensation product, as is described in my Patent No. 1,020,593, referred to. This result is apparently accomplished by the union of the methylene radical contained in the methylene-amin with the phenol resin, the nitrogen component of the hardening ingredient uniting with hydrogen from the phenol resin to form ammonia, which remains in unstable combination within the mass, or which may be evolved by heat. This ammonia is evolved with comparative ease. The hexa-methylene-amin or other methylene-amin compound seems to be the most suitable hardening substance which can be used, although other substances containing the methylene radical, as formaldehyde, tri-oxymethylene, etc., may be used. With the methylene-amin compounds, however, there is never any danger of losing any of the same by evolution as gas, if the composition is to remain for some time before its application and hardening by heat treatment, since the methylene-amin only gives up its methylene by combination with such a substance as the phenol resin upon heat treatment.

I prefer, as I have stated, to use the particular phenol resin described in my Patents No. 1,102,630 and No. 1,029,737 referred to rather than any of the "shellac substitutes" mentioned, for mixture with the hardening agent, and for many purposes the mixture with this described resin has particular advantages. My phenol resin, as described in the said application, is a fusible, soluble, phenol-formaldehyde condensation product, in which the formaldehyde is all combined with the phenol, and there is no free phenol, or only a small, ascertainable amount. This resin is a final product, in the sense that it can not be transformed into the infusible insoluble product by any amount of heating, at any temperature, either alone or with basic or acid condensing agents. It is preferably completely dehydrated by heating to about 400° F. It is preferably formed without the use of any condensing agent. When hexa-methylene-tetra-amin or a solid anhydrous polymerized formaldehyde like tri-oxy-methylene is used as the hardening agent, it should be noted that this ingredient also is anhydrous.

The ingredients may be separately dissolved in the solvent and mixed, or they may be dissolved together. Or, the methylene-amin and the phenol resin may be mixed while the resin is in fused condition at from 200 to 230 degrees F. without the use of a solvent. This mixture may then be rolled when it has cooled sufficiently to become pasty into thin sheets or laminæ suitable for being dissolved in the solvent, or the material may be formed in thin sheets by other means. The last described form of the composition is desirable for many uses, as it may be sold and transported in dry state in rolls, the purchaser or user dissolving the same in a suitable solution when he is ready to apply the composition in the same manner as shellac is transported and used.

The composition formed with a methylene-amin compound may be kept for a considerable time in solution in closed receptacles without harmful change. It is non-corrosive to metals either in solution or dry, and forms an efficient preservative coating for metals to prevent oxidation and other corrosive actions.

When the methylene-amin compound is mixed with the phenol resin in the fused state, the mixing and rolling of the material are carried out without change of the material into the hard infusible product, since the hardening reaction does not take place immediately, but is gradual at the temperature required for the mixing of the ingredients. Hardening of the film of varnish or enamel after evaporation of the solvent takes place at quite moderate temperatures and is greatly accelerated by increased temperatures. This hardening requires no compensating pressure to prevent frothing or the formation of bubbles, and the film is formed without cracks or other defects due to the evolution of gas during the final reaction of the ingredients. The varnish or enamel may be hardened by passing any body which gives out radiant heat over the surface of the enamel film close to the same, but not in contact therewith. Thus, a heated flat iron, electric heater, or similar heating device, may be used.

Suitable proportions of the liquid enamel or varnish are 100 parts of phenol resin, 8 to 10 parts of hexa-methylene-amin, 100 to 500 parts of solvent which may be wood alcohol, methylated spirits, grain alcohol, denatured alcohol, acetone, or mixtures of the same with each other or with small percentages of water.

When the liquid enamel or lacquer is designed to be used as a protective coating on metal, the proportion of the hexa-methylene-amin may be reduced to from 4 to 6 parts to 100 parts of the phenol resin. When the liquid enamel or lacquer is designed to be used as a film applied to a suitable backing to be embossed or shaped after evaporation of the solvent and hardening by heat, a solid solvent ingredient such as those mentioned in Patent No. 1,102,630 or Patent No. 1,020,593 above referred to, may be added in percentages which may be varied between 5 and 25 per cent., dependent upon the particular use desired, the nature of the solid solvent and its solubility in the volatile solvent used in the lacquer.

The solid solvents mentioned in Patent No. 1,102,630 as there described are termed "final product solvents" by which term are included only such substances as will dissolve the ultimate condensation product or combine therewith at the baking temperature, render it plastic at such temperature, and remain as a part of the product in the condition of solid solution, both when the ultimate product is hot and when it is cold. Among the examples of this class which may be mentioned are naphthalene and some of its derivatives, such as nitro and chloroderivatives, especially the mono-nitro and di-nitro and mono-chloro and tetra-chloro napthalenes, di-nitro benzene, preferably the meta variety, acetanilid, ricinoleic acid and ricinelaidic acid and their anhydrids, benzoic acid and anhydrid and di-phenylamin.

My Patent No. 1,065,495, granted June 24, 1913, covers in its broader aspects a composition similar to that described and claimed herein. The said patent is however, limited in its claim to the use of a normally non-volatile fluid solvent, or to a solvent comprising an organic liquid which is immiscible with water and whose boiling point exceeds that of water, or specifically to liquid mono-chloro-naphthalene, or to a solvent containing both a volatile solvent and a normally non-volatile liquid solvent, or organic liquid non-water-miscible solvent of boiling point exceeding that of water.

The present application claims a varnish or enamel comprising substances, such as phenol resin and a hardening agent therefor, dissolved in a volatile solvent. It also claims a varnish or enamel comprising substances capable of transformation by chemical reaction upon application of heat, a volatile solvent therefor, or, generically expressed, a solvent therefor comprising a liquid oxygen compound of the aliphatic series, and an additional organic element, soluble in said solvent, referred to as an aromatic compound, or a compound of the benzene series, or as a specific example, di-nitro-benzene. It is to be noted that the body so described is not limited to a normally fluid or liquid substance as is the case with the non-volatile or non-water-miscible organic solvent included in the claims of my Patent No. 1,065,495, referred to above.

All of the so-called solid solvents or "final product solvents" referred to above as desirable to be added to the liquid enamel in certain circumstances, are aromatic compounds, and various of them, such for example as di-nitro-benzene, benzoic acid, acetanilid, etc., are compounds of the benzene series. Such bodies dissolve, in the proportions used, in the acetone, alcohol, or equivalent solvent used for the varnish or enamel, and produce the desirable properties referred to above.

Having now described my invention what I claim and desire to protect by Letters Patent is:—

1. As a new composition of matter, a varnish or enamel comprising a volatile solvent, and a fusible resin of phenolic origin and hexa-methylene-tetra-amin, both dissolved in said solvent, substantially as described.

2. As a new composition of matter, a varnish or enamel comprising a volatile solvent, and a fusible resin of phenolic origin and a substance which is capable of combining with the said resin on application of heat to harden the same to infusibility and insolubility, both dissolved in said solvent, the said resin being characterized by its incapability of transformation into an infusible and insoluble body, when not mixed with such a substance, substantially as described.

3. As a new composition of matter, a varnish or enamel comprising a volatile solvent, and an anhydrous phenol resin and an anhydrous methylene-containing hardening agent therefor, both dissolved in said solvent, substantially as described.

4. As a new composition of matter, a varnish or enamel comprising a volatile solvent, and an anhydrous phenol resin and an anhydrous methylene-containing hardening agent therefor, both dissolved in said solvent, the said resin being characterized by its incapability of transformation into an infusible and insoluble body, when not mixed with such an agent, substantially as described.

5. As a new composition of matter, a varnish or enamel comprising a volatile solvent, a phenol resin substantially free from uncombined formaldehyde or equivalent, and hexa-methylene-tetra-amin, in the proportion of from 4 to 10 per cent. of the weight of the resin, both said resin and hexa-methylene-tetra-amin being dissolved in said solvent, substantially as described.

6. As a new composition of matter, a varnish or enamel comprising substances capable of transformation by chemical reaction upon application of sufficient heat to form a hard infusible phenolic condensation product, a volatile solvent comprising a liquid oxygen-compound of the aliphatic series, and a compound of the benzene series soluble in said volatile solvent, substantially as described.

7. As a new composition of matter, a varnish or enamel comprising substances capable of transformation by chemical reaction upon application of sufficient heat to form a hard infusible phenolic condensation product, a solvent therefor comprising a liquid oxygen-compound of the aliphatic series, and a compound containing the benzene ring soluble in said solvent, substantially as described.

8. As a new composition of matter, a varnish or enamel comprising substances capable of transformation by chemical reaction upon application of sufficient heat to form a hard infusible phenolic condensation product, a solvent therefor comprising acetone, and an aromatic compound soluble in said solvent, substantially as described.

9. As a new composition of matter, a varnish or enamel comprising substances capable of transformation by chemical reaction upon application of sufficient heat to form a hard infusible phenolic condensation product, a solvent therefor comprising a liquid oxygen-compound of the aliphatic series, and di-nitro benzene, substantially as described.

10. As a new composition of matter, a varnish or enamel comprising substances capable of transformation by chemical reaction upon application of sufficent heat to form a hard infusible phenolic condensation product, a solvent therefor comprising a liquid oxygen-compound of the aliphatic series, and a cyclic hydrocarbon, substantially as described.

This specification signed and witnessed this 28th day of November, 1913.

JONAS W. AYLSWORTH.

Witnesses:
FREDERICK BACHMANN,
HENRY LANAHAN.